United States Patent
Goodman et al.

(10) Patent No.: US 11,975,786 B2
(45) Date of Patent: May 7, 2024

(54) CONVERTIBLE CARGO HOLDER

(71) Applicant: RADIO FLYER INC., Chicago, IL (US)

(72) Inventors: Anne Goodman, Chicago, IL (US); Collin Ostergaard, Chicago, IL (US); Kyle Kenagy, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 183 days.

(21) Appl. No.: 17/829,741

(22) Filed: Jun. 1, 2022

(65) Prior Publication Data
US 2022/0379989 A1     Dec. 1, 2022

Related U.S. Application Data

(60) Provisional application No. 63/195,511, filed on Jun. 1, 2021.

(51) Int. Cl.
*B62J 9/23*     (2020.01)
*B62J 7/04*     (2006.01)
*B62K 27/02*    (2006.01)

(52) U.S. Cl.
CPC ............ *B62J 9/23* (2020.02); *B62K 27/02* (2013.01); *B62J 7/04* (2013.01)

(58) Field of Classification Search
CPC ....... B62J 7/04; B62J 9/23; B62J 1/16; B62K 27/02
USPC ............... 220/9.4; 224/415, 416, 436, 438
See application file for complete search history.

(56) References Cited

U.S. PATENT DOCUMENTS

| | | | | |
|---|---|---|---|---|
| 2,544,075 A | * | 3/1951 | Ernst | B65D 37/00 383/111 |
| 3,322,313 A | * | 5/1967 | Giondi | B62J 9/21 224/438 |
| 3,396,885 A | * | 8/1968 | Giondi | B62J 9/23 224/438 |
| 4,295,586 A | * | 10/1981 | Shockley | B62J 7/04 224/438 |

(Continued)

FOREIGN PATENT DOCUMENTS

| | | |
|---|---|---|
| CN | 104960602 A | 10/2015 |
| WO | 9702172 A1 | 1/1997 |

OTHER PUBLICATIONS

"Your old favorite kids' wagon-maker Radio Flyer is rolling out e-bikes for brownups," available online at shorturl.at/BY689 (5 pages).

(Continued)

*Primary Examiner* — Justin M Larson
(74) *Attorney, Agent, or Firm* — Barnes & Thornburg LLP

(57) ABSTRACT

A convertible cargo holder for a bicycle that is operable in a cargo mode and a child carry mode. The holder has a frame that is secured to the bicycle and that has a hoop. A liner is removably secured to the frame and has first and second side walls, first and second end walls, and a bottom wall. The liner has disconnecting fasteners to secure the side walls to the end walls, and disconnecting fasteners to secure the liner to the hoop. In cargo mode the side walls are secured to the end walls, and each of the walls are secured to the hoop to create a basket. In child carry mode the side walls are disconnected from the end walls and the hoop, and the side walls hang below the bottom wall. Seats are also provided.

20 Claims, 8 Drawing Sheets

(56) References Cited

U.S. PATENT DOCUMENTS

| | | | | |
|---|---|---|---|---|
| 4,345,703 | A | * | 8/1982 | Allen ................... B62J 9/20 224/438 |
| 4,367,829 | A | * | 1/1983 | Kusz ................... B62J 7/04 297/215.11 |
| 5,285,935 | A | | 2/1994 | Hsueh |
| 5,310,077 | A | * | 5/1994 | McDermott ........... B65D 25/16 217/3 R |
| 5,622,374 | A | | 4/1997 | Rudeen et al. |
| D676,241 | S | * | 2/2013 | Merrill .................... D3/318 |
| D775,468 | S | * | 1/2017 | Szucs ..................... D3/318 |
| D976,803 | S | * | 1/2023 | Goodman ................ D12/407 |
| D991,141 | S | * | 7/2023 | Goodman ................ D12/412 |
| 2010/0155443 | A1 | * | 6/2010 | Lasater ................ B62K 27/003 224/448 |
| 2023/0159124 | A1 | * | 5/2023 | Knapp .................... B62K 7/04 296/78.1 |
| 2023/0365067 | A1 | * | 11/2023 | Labbe ................ B60K 15/0409 |

OTHER PUBLICATIONS

International Search Report and Written Opinion issued to PCT/US22/31747, dated Sep. 13, 2022 (27 pages).

"Rad Power Bikes Caboose Accessory," available online at https://bit.ly/3wFhCHs (available at least as early as Jun. 1, 2021) (5 pages).

"Blix Bike VIP Section Accessory," available online at https://bit.ly/3TuDobu (available at least as early as Jun. 1, 2021) (3 pages).

"Xtracycle Hooptie Accessory," available online at https://bit.ly/3pTJh3J (available at least as early as Jun. 1, 2021) (8 pages).

"Yuba Adjustable Monkey Bars Accessory," available online at https://bit.ly/3B02wil (available at least as early as Jun. 1, 2021) (3 pages).

"Tern Clubhouse + Accessory," available online at https://www.ternbicycles.com/us/accessories/471/clubhouse-0 (available at least as early as Jun. 1, 2021) (10 pages).

"Tern Clubhouse Mini Accessory," available online at https://bit.ly/3AZGFla (available at least as early as Jun. 1, 2021) (7 pages).

* cited by examiner

CONVERTIBLE CARGO HOLDER

CROSS-REFERENCE TO RELATED APPLICATIONS

This application claims the benefit of U.S. Provisional Patent Application No. 63/195,511 filed Jun. 1, 2021, which is expressly incorporated herein by reference and made a part hereof.

FEDERALLY SPONSORED RESEARCH OR DEVELOPMENT

Not Applicable.

TECHNICAL FIELD

The present subject matter relates to cargo holders, and more particularly, to cargo holders that convert to a child seat for a bicycle.

BACKGROUND

Cargo holders and bicycle seats are known in the art. While such products according to the prior art provide a number of advantages, they nevertheless have certain limitations. The present disclosure seeks to overcome certain of those limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology relates to a convertible cargo holder for a bicycle that convers between a cargo mode and a child carry mode.

The disclosed technology further relates to a convertible cargo holder for a bicycle, the convertible cargo holder being operable in two modes, a cargo mode and a child carry mode, comprising: a frame comprising a first frame end having a first end and a second end, a second frame end having a first end and a second end, and a hoop secured to the first end of the first frame end and the first end of the second frame end, wherein a first bracket is provided at the second end of the first frame end, and a second bracket is provided at the second end of the second frame end, wherein the first and second brackets are secured to the bicycle to secure the frame to the bicycle, and wherein the hoop has a first end portion adjacent the first frame end, a second end portion adjacent the second frame end, a first side portion between the first frame end and the second frame end, and a second side portion opposite the first side portion and between the first frame end and the second frame end; a liner removably secured to the frame, the liner having first and second side walls, first and second end walls, and a bottom wall; wherein in the cargo mode the first end of the first side wall is removably secured to the first end of the first end wall with a zipper connection, the second end of the first side wall is removably secured to the first end of the second end wall with a zipper connection, the first end of the second side wall is removably secured to the second end of the first end wall with a zipper connection, the second end of the second side wall is removably secured to the second end of the second end wall with a zipper connection, a top of the first end wall is secured to first end portion of the hoop, a top of the second end wall is secured to the second end portion of the hoop, a top of the first side wall is secured to the first side portion of the hoop, and a top of the second side wall is secured to the second side portion of the hoop; wherein in the child carry mode the zipper connection between the first end of the first side wall and the first end of the first end wall is unzipped and the zipper connection between the second end of the first side wall and the first end of the second end wall is unzipped to disconnect at least a portion of the first side wall from the first end wall and the second end wall, and the zipper connection between the first end of the second side wall and the second end of the first end wall is unzipped and the zipper connection between the second end of the second side wall and the second end of the second end wall is unzipped to disconnect at least a portion of the second side wall from the first end wall and the second end wall; and, a first receiver positioned adjacent a rear wheel of the bicycle and distal the hoop to secure the top of the first side wall of the liner thereto in the child carry mode, and a second receiver positioned adjacent an opposing side of the rear wheel of the bicycle and distal the hoop to secure the top of the second side wall of the liner thereto in the child carry mode.

The disclosed technology further relates to a convertible cargo holder for a bicycle, the convertible cargo holder being operable in two modes, a cargo mode and a child carry mode, comprising: a frame comprising a first frame end, a second end frame, and a hoop secured to the first frame end and the second frame end, wherein the frame is secured to the bicycle; a liner removably secured to the frame, the liner having first and second side walls, first and second end walls, and a bottom wall, the liner further having disconnecting fasteners to secure the first side wall to the first and second end walls, and disconnecting fasteners to secure the second side wall to the first and second end walls; wherein in the cargo mode the first side wall is secured to the first and second end walls, the second side wall is secured to the first and second end walls, and tops of the first side wall, second side wall, first end wall and second end wall are secured to the hoop to create a basket; and, wherein in the child carry mode the first side wall is disconnected from the first and second end walls and from the hoop, and the second side wall is disconnected from the first and second end walls and from the hoop, and wherein the first side wall and the second side wall hang below the bottom wall.

The disclosed technology further relates to a convertible cargo holder for a bicycle, the convertible cargo holder being operable in two modes, a cargo mode and a child carry mode, comprising: a frame comprising a first frame end, a second end frame, and a hoop secured to the first frame end and the second frame end, wherein the frame is secured to the bicycle; a liner removably secured to the frame, the liner having first and second side walls, first and second end walls, and a bottom wall, wherein the first side wall is removably secured to the first and second end walls, and wherein the second side wall is removably secured to the first and second end walls; wherein in the cargo mode the first side wall is secured to the first and second end walls, the second side wall is secured to the first and second end walls, and tops of the first side wall, second side wall, first end wall and second end wall are secured to the hoop to create a basket; wherein in the child carry mode the first side wall is disconnected from the first and second end walls and from the hoop, and the second side wall is disconnected from the first and second end walls and from the hoop, and wherein the first side wall and the second side wall hang below the bottom wall; and, a first receiver positioned adjacent a rear wheel of the bicycle and distal the hoop to secure the top of the first side wall of the liner thereto in the child carry mode, and a second receiver positioned adjacent an opposing side of the rear wheel of the bicycle and distal the hoop to secure the top of the second side wall of the liner thereto in the child carry mode.

The disclosed technology further relates to a convertible cargo, further having at least one fastener for securing the top of the first end wall to first end portion of the hoop, at least one fastener for securing the top of the second end wall to the second end portion of the hoop, at least one fastener for securing the top of the first side wall to the first side portion of the hoop, and at least one fastener for securing the top of the second side wall to the second side portion of the hoop.

The disclosed technology further relates to a convertible cargo holder, wherein the liner further comprises a bottom wall between a bottom of the first end wall, a bottom of the second end wall, a bottom of the first side wall, and a bottom of the second side wall.

The disclosed technology further relates to a convertible cargo holder, wherein the bottom wall has at least one opening there through to allow access to the bicycle.

The disclosed technology further relates to a convertible cargo holder, further having a first seat for the convertible cargo holder that is secured to the bicycle through the at least one opening in the bottom wall.

The disclosed technology further relates to a convertible cargo holder, further having a second seat for the convertible cargo holder that is secured to the bicycle through another of the at least one opening in the bottom wall.

The disclosed technology further relates to a convertible cargo holder, further having a removable child bicycle seat for the convertible cargo holder that is secured to the bicycle through the at least one opening in the bottom wall.

The disclosed technology further relates to a convertible cargo holder, further having a first receiver positioned adjacent a rear wheel of the bicycle and distal the hoop to secure the top of the first side wall of the liner thereto in the child carry mode, and a second receiver positioned adjacent an opposing side of the rear wheel of the bicycle and distal the hoop to secure the top of the second side wall of the liner thereto in the child carry mode.

The disclosed technology further relates to a convertible cargo holder, further having a disconnecting fastener to secure the top of first side wall to the hoop, and a disconnecting fastener to secure the top of the second side wall to the hoop.

The disclosed technology further relates to a convertible cargo holder, wherein the frame is secured to the bicycle by connecting the first frame end to the bicycle and the second frame end to the bicycle.

The disclosed technology further relates to a convertible cargo holder, further having fasteners to secure the first side wall to the first and second end walls, and fasteners to secure the second side wall to the first and second end walls.

The disclosed technology further relates to a convertible cargo holder, wherein the fasteners to secure the first side wall and the second side wall to the first and second end walls are zippers.

The disclosed technology further relates to a convertible cargo holder, the liner further having a fastener to secure the top of the first side wall to the hoop, and a fastener to secure the top of the second side wall to hoop.

The disclosed technology further relates to a convertible cargo holder, further having a first seat for the convertible cargo holder that engages one of the first frame end and the second frame end, and that is secured to the bicycle through the at least one opening in the bottom wall.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure. In the drawings.

Figure 1:
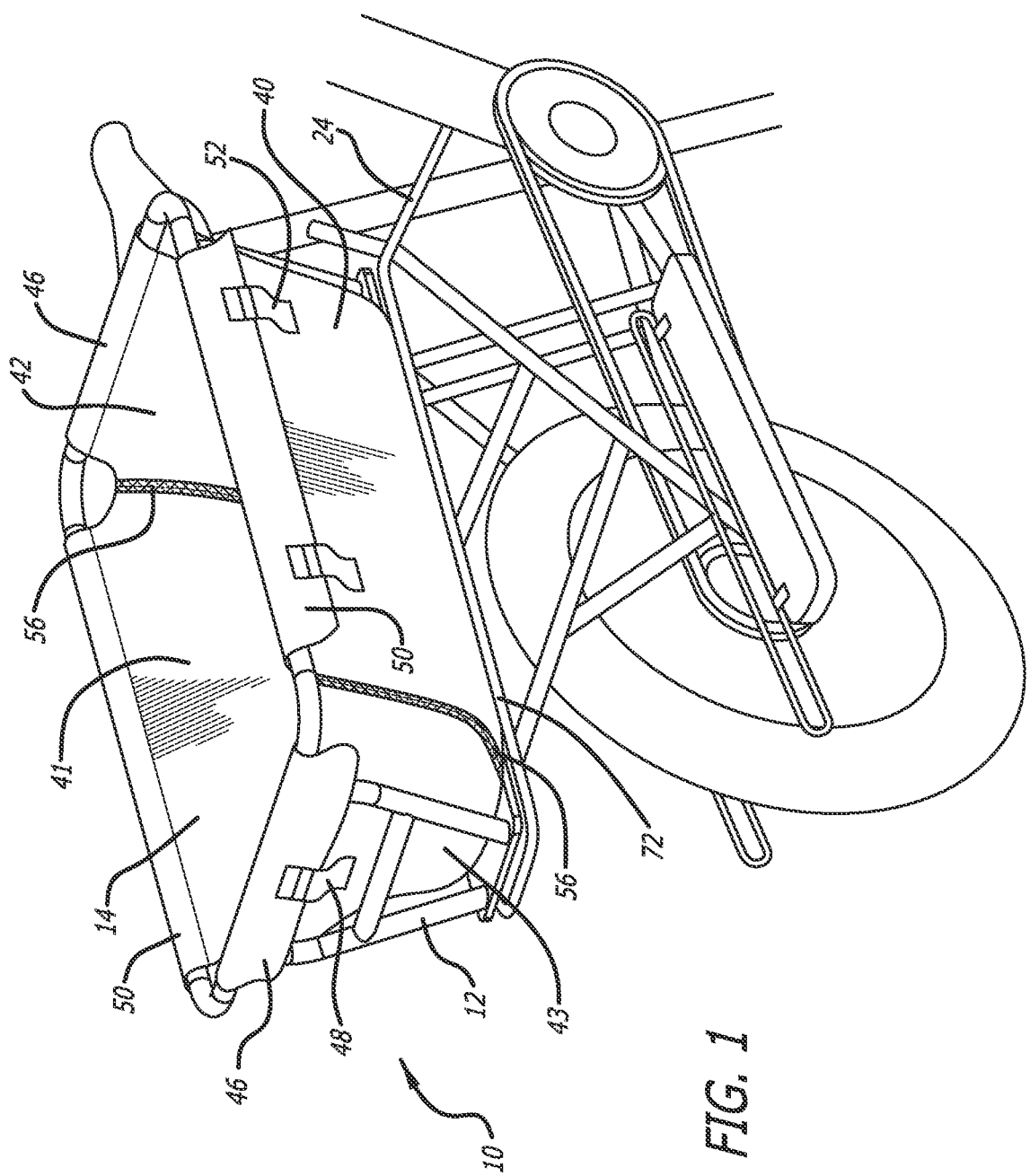
FIG. 1 is a perspective view of a cargo holder according to the present disclosure, shown in its environment of use in a first mode.
Figure 2:
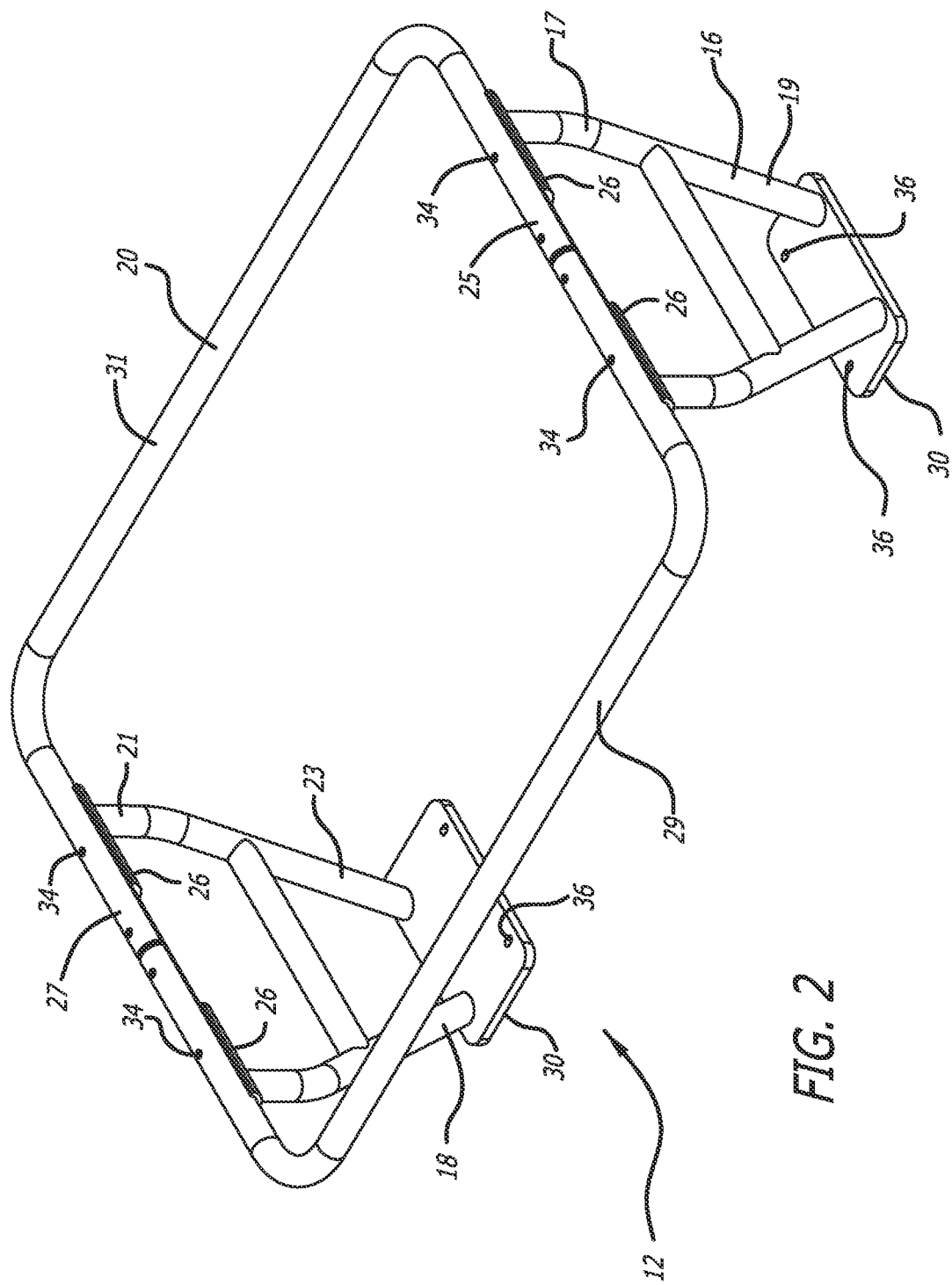
FIG. 2 is perspective view of a frame for the cargo holder according to the present disclosure.
Figure 3:
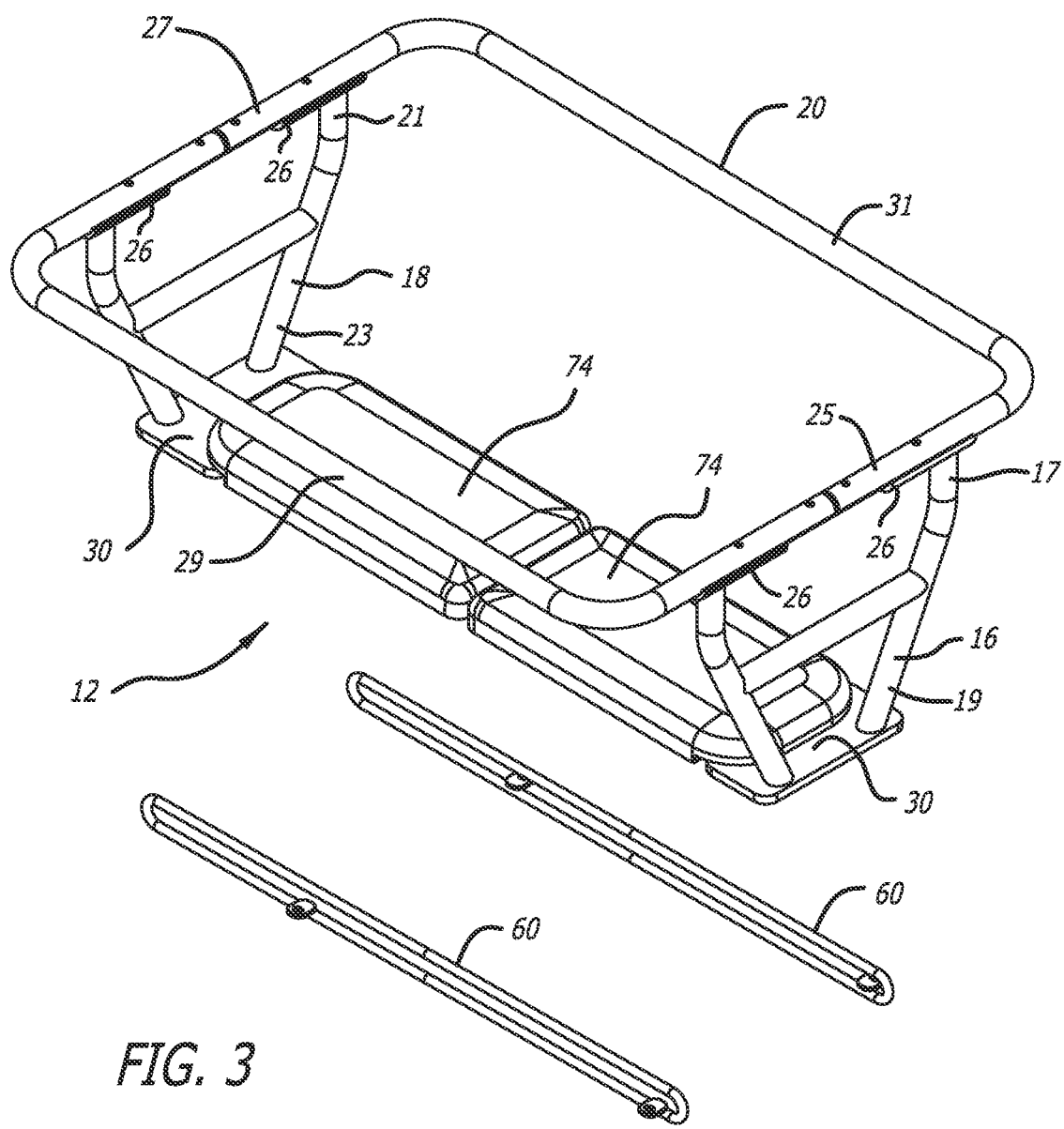
FIG. 3 is a perspective view of the cargo holder frame of FIG. 4, with auxiliary seats, according to the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law.

Figure 7:
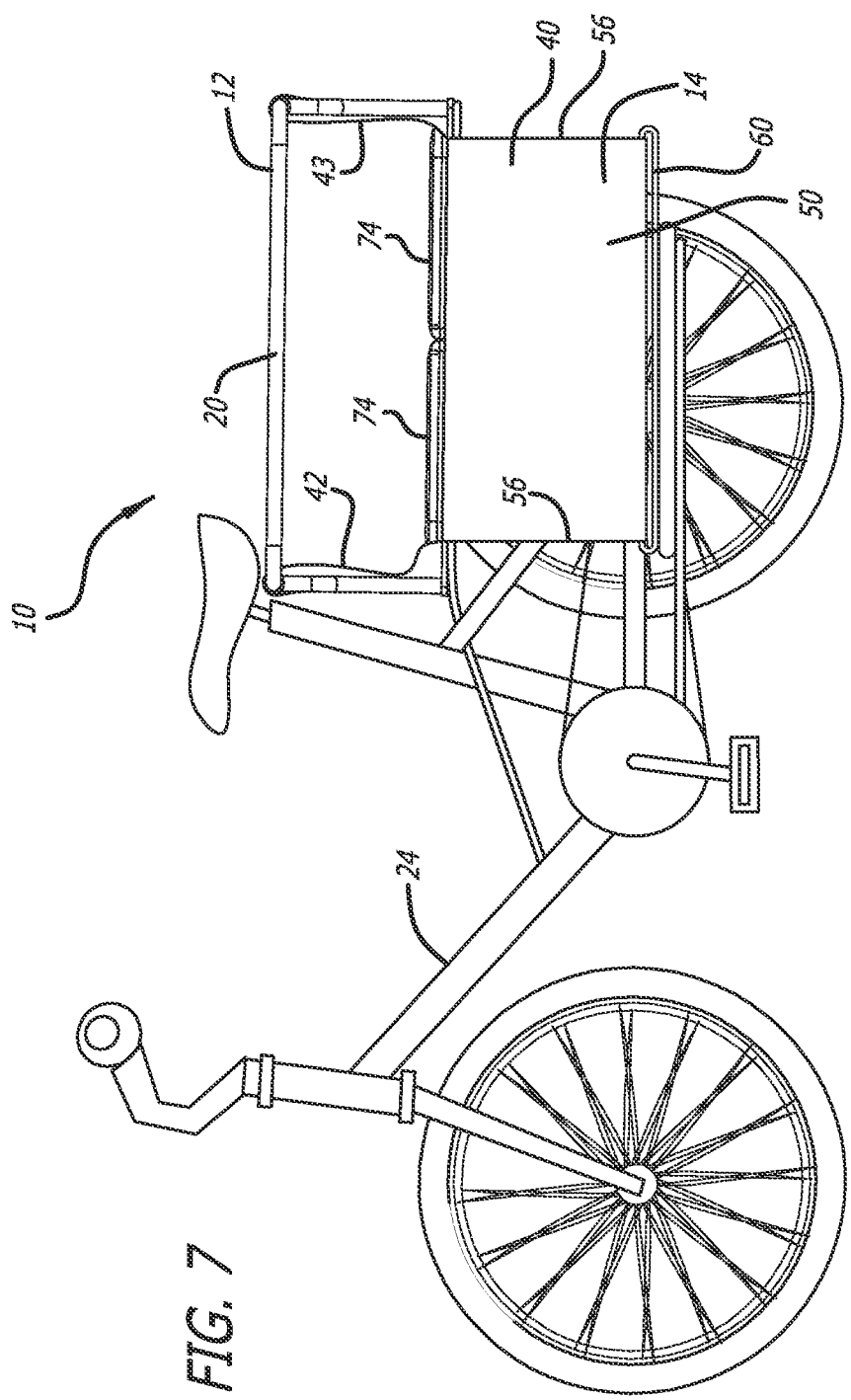
FIG. 7 is a side view of a cargo holder according to the present disclosure, shown in its environment of use in a second mode and with two auxiliary flat seats.
Figure 8:
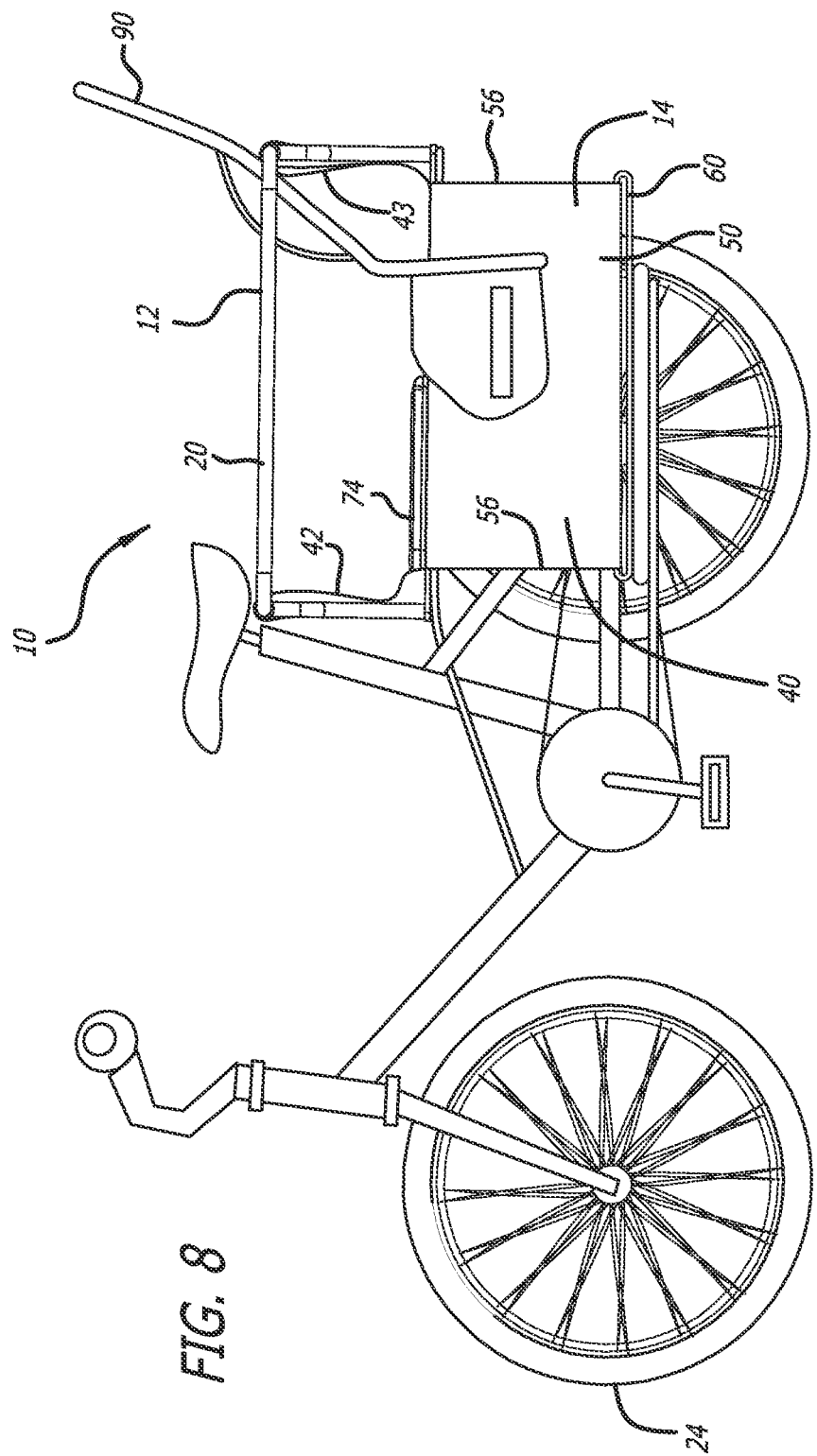
FIG. 8 is a side view of a cargo holder according to the present disclosure, shown in its environment of use in a second mode and with one auxiliary flat seat and one auxiliary child seat.

Generally, this disclosure describes several embodiments of cargo holders 10 that are arrangeable in a variety of different orientations. Typically, as shown in FIG. 1, the cargo holder 10 is utilized with bicycles, including e-bikes, and is connected directly to the bicycle, such as to the frame of the bicycle. The cargo holder 10 is operable in two modes, a storage or cargo mode as shown in FIG. 1, and a kid transport/child carry mode as shown in FIGS. 7 and 8, and can accept a variety of accessories.

Referring now to the figures, and initially to FIGS. 1-3 and 5, there is shown an embodiment of a cargo holder 10 for carrying cargo or children. In one embodiment, the cargo holder 10 generally comprises a frame 12 and a liner 14. And, in one embodiment the frame 12 comprises a first frame end 16, a second frame end 18, and a hoop 20. In one embodiment, the cargo holder 10 is secured to a bicycle 24 behind the bicycle seat, as shown in FIG. 1.

In one embodiment, the first frame end 16 has a first end 17 and a second end 19, and the second frame end 18 has a first end 21 and a second end 23. The hoop 20 is secured to the first end 17 of the first frame end 16 and the first end 21 of the second frame end 18. The first and second frame ends 16, 18 have receivers 26 at the respective first ends 17, 21 thereof to support the hoop 20. In one embodiment, the hoop 20 is made of tubular aluminum material, although other materials such as metal, plastic, wood, etc., whether in tubular, solid, square, etc. form will work as the hoop 20. Additionally, in one embodiment the hoop 20 is rectangular in shape, however, it may be any other shape acceptable to provide the desired function. In one embodiment, the hoop 20 has a first end portion 25 adjacent the first frame end 16, a second end portion 27 adjacent the second frame end 18, a first side portion 29 between the first frame end 16 and the second frame end 18, and a second side portion 31 opposite the first side portion 29 and between the first frame end 16 and the second frame end 18. The receivers 26 support the hoop 20. The hoop 20 may be fixedly or removably secured to the receivers 26. In one embodiment the hoop 20 has apertures 34 and the receivers 26 have mating apertures (not shown) such that bolts can be fitted through the apertures 34 and secured with nuts to secure the hoop 20 to the receivers 26 of the first and second frame ends 16, 18.

The first and second frame ends 16, 18 also each have a bracket 30 at the second ends 29, 23 thereof to secure the frame 12 to the bicycle 24, preferably removably, such as with the use of bolts and nuts (not shown). In one embodiment, the brackets 30 comprise a plate that is preferably welded to the first and second frame ends 16, 18, respectively. The brackets 30 have apertures 36 to allow the frame 12 to be removably secured to the bicycle 24 with the use of bolts and nuts.

Figure 5:
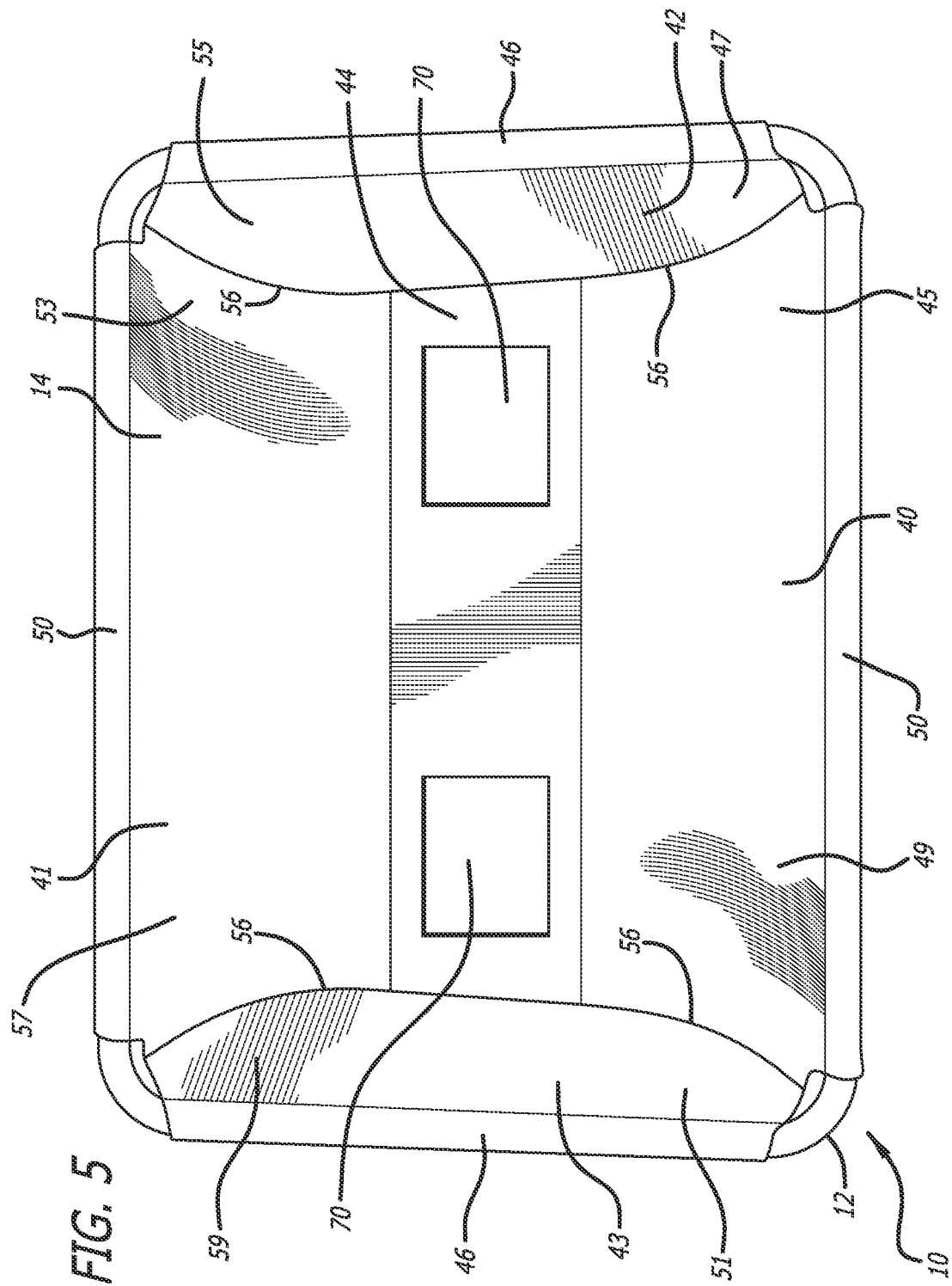
FIG. 5 is a top view of the cargo holder, according to the present disclosure, removed from a bicycle

The liner 14 is removably secured to the frame 12 as shown in FIGS. 1, 5, 7 and 8. The liner 14 has first and second side walls 40, 41, first and second end walls 42, 43 and a bottom wall 44 to create a basket in the cargo mode. In one embodiment, the liner 14 is soft sided and made of a fabric material. In one embodiment, the ends or tops 46 of the end walls 42, 43 extend over the hoop 20 and are secured with fasteners 48, such as snaps 48 around the hoop 20, to the respective end wall 42, 43 as shown in FIG. 1, to secure the end walls 42, 43 of the liner 14 to the frame 12. Similarly, in one embodiment, the ends or tops 50 of the side walls 40, 41 extend over the hoop 20 and are secured with fasteners 52, such as clips 52 around the hoop 20, as shown in FIG. 1, that connect with mating fasteners 52 on the side walls 40, 41 to secure the side walls 40, 41 of the liner 14 to the frame 12. Zippers 56 may be provided at the edges of the side walls 40, such as at the joint between the side walls 40 and the end walls 42, as shown in FIGS. 1 and 5. The zippers 56 allow the side walls 40, 41 to be disconnected from the end walls 42, 43.

As shown in FIGS. 7-8, the user can disconnect the fasteners 52 to unsecure the side walls 40, independently, from the frame 12. The user can then unzip the zippers 56, also referred to as disconnecting fasteners, to allow the side walls 40 to hang down from the bottom wall 44 of the liner 14. In one embodiment, the frame 12 also includes receivers 60 that are connected to a lower portion of the frame of the bicycle 24. After the user unzips the side walls 40 the user can secure the ends 50 of the side walls 40 to the receivers 60 using the fasteners 52. In one embodiment, a first receiver 60 is positioned adjacent a rear wheel of the bicycle 24 and distal the hoop 20 to secure the top 50 of the first side wall 40 of the liner 14 thereto in the child carry mode, and a second receiver 60 is positioned adjacent an opposing side of the rear wheel of the bicycle 24 and distal the hoop 20 to secure the top 50 of the second side wall 41 of the liner 14 thereto in the child carry mode.

In one embodiment, in the cargo mode a first end 45 of the first side wall 40 is removably secured to a first end 47 of the first end wall 42 with a zipper connection 56, a second end 49 of the first side wall 40 is removably secured to a first end 51 of the second end wall 43 with a zipper connection 56, a first end 53 of the second side wall 41 is removably secured to a second end 55 of the first end wall 42 with a zipper connection 56, a second end 57 of the second side wall 41 is removably secured to a second end 59 of the second end wall 43 with a zipper connection 56. Further, in one embodiment, in the cargo mode the top 46 of the first end wall 42 is secured to first end portion 25 of the hoop 20, a top 46 of the second end wall 43 is secured to the second end portion 27 of the hoop 20, a top 50 of the first side wall 40 is secured to the first side portion 29 of the hoop 20, and a top 50 of the second side wall 41 is secured to the second side portion 31 of the hoop 20.

Figure 6:
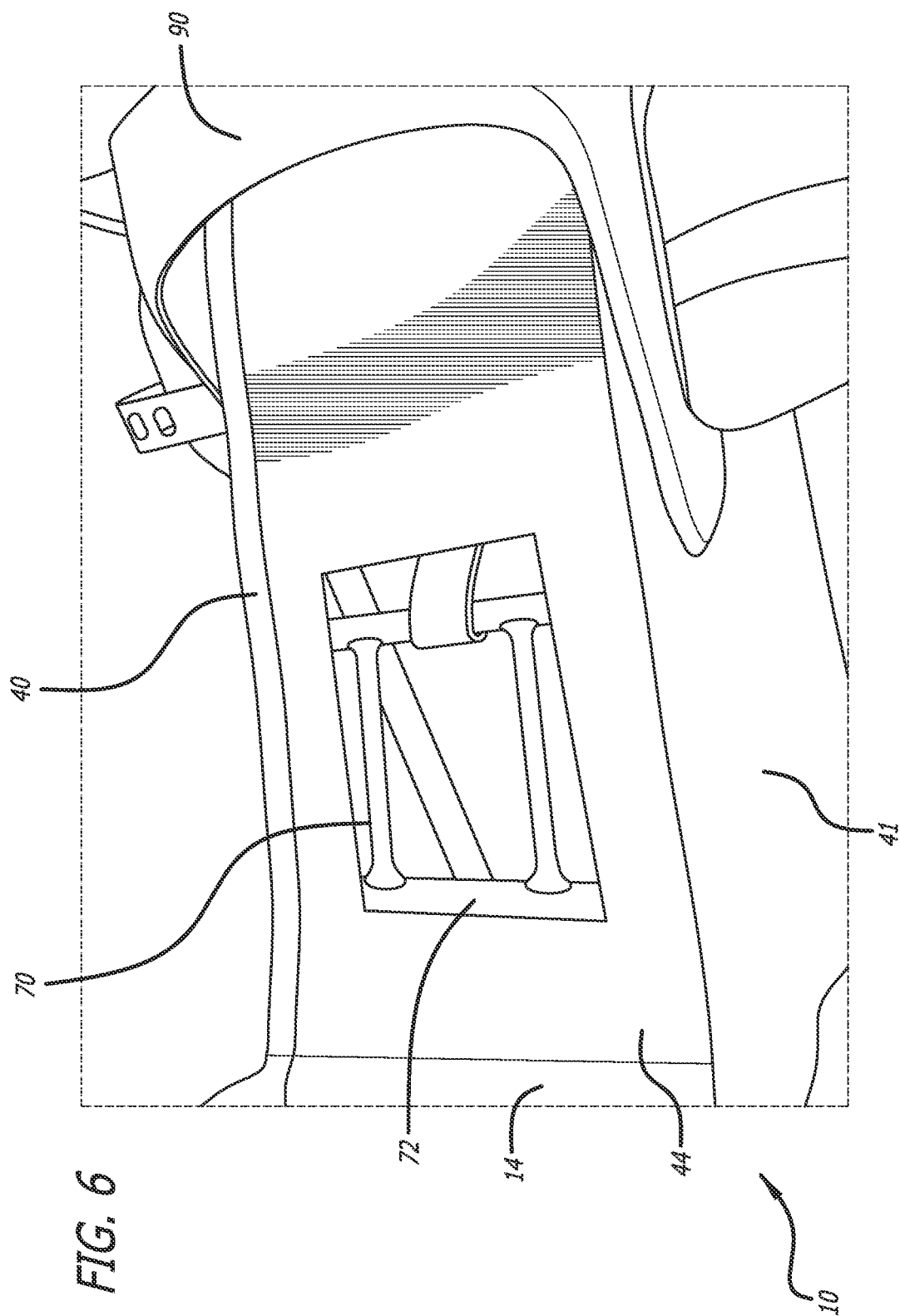
FIG. 6 is a partial top view of the cargo holder according to the present disclosure, shown in its environment of use in a second mode.

In one embodiment in the child carry mode as shown in FIGS. 6-8, the zipper connection 56 between the first end 45 of the first side wall 40 and the first end 47 of the first end wall 42 is unzipped and the zipper connection 56 between the second end 49 of the first side wall 40 and the first end 51 of the second end wall 43 is unzipped to disconnect at least a portion of the first side wall 40 from the first end wall 42 and the second end wall 43. Further, in one embodiment the zipper connection 56 between the first end 53 of the second side wall 41 and the second end 55 of the first end wall 42 is unzipped and the zipper connection 56 between the second end 57 of the second side wall 41 and the second end 59 of the second end wall 43 is unzipped to disconnect at least a portion of the second side wall 41 from the first end wall 42 and the second end wall 43. The side walls 40, 41 hang down and are connected to the receivers 60 to operate as a wall of protection for a user's legs from the wheel and chain of the bicycle.

Figure 4:
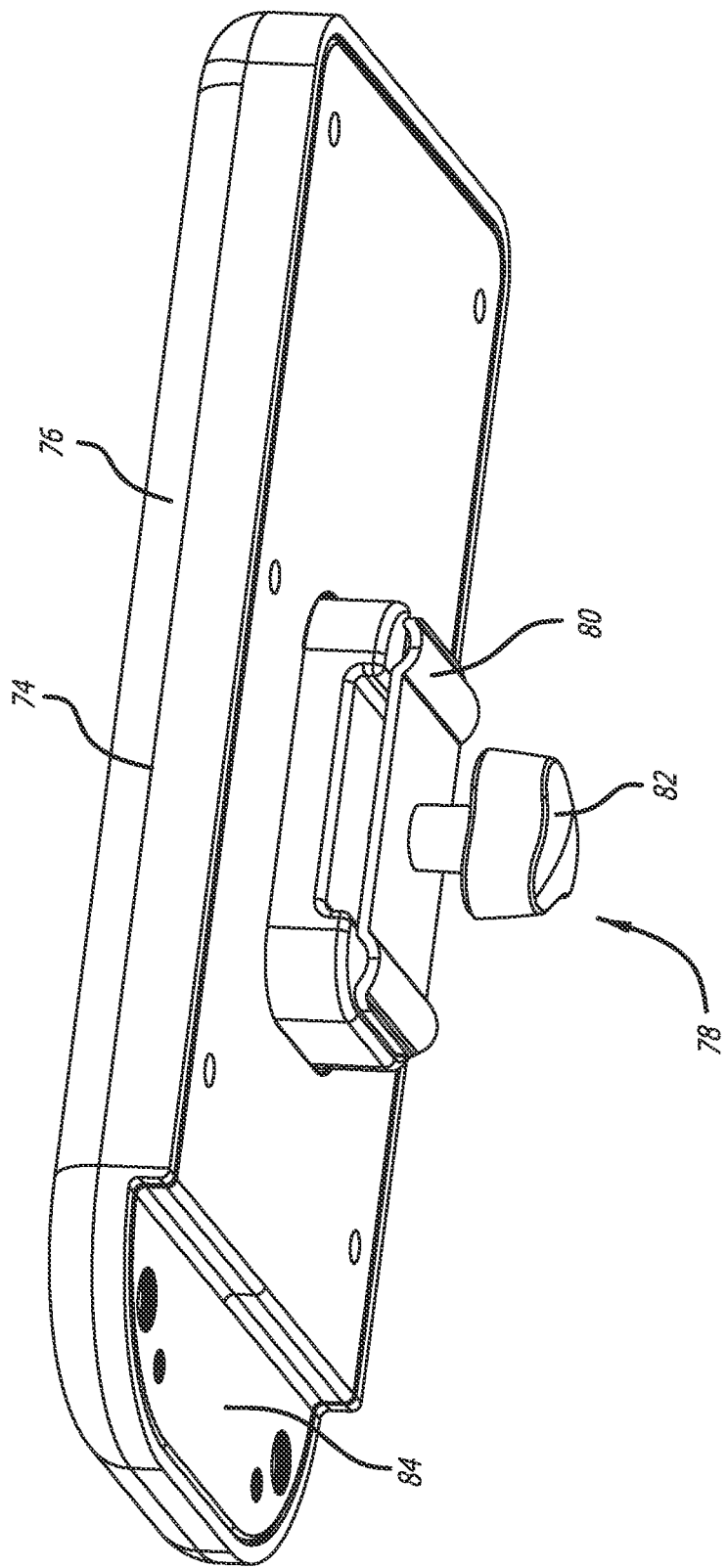
FIG. 4 is a bottom perspective view of an auxiliary seat for the cargo holder, according to the present disclosure.

As shown in FIGS. 5 and 6, in one embodiment there are a plurality of openings 70 in the bottom wall 44 of the liner 14. The bottom wall 44 is located between a bottom of the first end wall 42, a bottom of the second end wall 43, a bottom of the first side wall 40, and a bottom of the second side wall 41. The openings 70 provide access through the liner 14 to the bicycle frame 72, as shown in FIG. 6. Such access allows removable seating components, and other accessories, to be secured to the bicycle frame 72 in combination with the cargo holder 10. For example, generally flat seats 74, as shown in FIGS. 7 and 8, can be secured to the bicycle frame 72 through the respective openings 70 in the liner 14. In one embodiment, as shown in FIG. 4, the seat 74 has a cushion component 76 and a securing device 78. The securing device 78 has a rotatable bracket 80 that can rotate from a first position. For example, in the first position the seat 74 can be set on the bicycle frame 72 and the securing device 78 can be inserted through the opening 70 in the liner 14. The bracket 80 can be turned 90° to allow the bracket 80 of the securing device 78 to engage the bicycle frame 72 and to be secured thereto with a fastening knob 82. Additionally, in one embodiment the seat 74 has a shoulder 84 that sits on the bracket 30 of the frame 12 of the cargo holder 10. In one embodiment, one or two generally flat seats 74 can be independently and separately secured to the bicycle frame 72 through the separate openings 70 in the liner 14 of the cargo holder 10. Referring to FIGS. 7 and 8, in such an embodiment one or two children can sit on the flat seats 74 and ride on the bicycle during use of the bicycle.

In an alternate embodiment, as shown in FIG. 8, a child bicycle seat 90 can be secured to the bicycle frame 72 through the separate openings 70 in the liner 14 of the cargo holder 10. In a preferred embodiment, the child seat 90 will replace one of the flat seats 74. Accordingly, in such an embodiment one child can sit on the flat seat 74 and another child can sit in the child seat 90. In yet another alternate embodiment, two child seats 90 can be secured to the bicycle frame 72 through the separate openings 70 in the liner 14 of the cargo holder 10. In a preferred embodiment, the two child seats 90 will replace both of the flat seats 74.

The embodiments detailed hereinabove may be combined in full or in part, with any alternative embodiments described.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

It will be understood that the present disclosure may be embodied in other specific forms without departing from the spirit or central characteristics thereof. The present examples and embodiments, therefore, are to be considered in all respects as illustrative and not restrictive, and the Claims are not to be limited to the details given herein. Accordingly, while the specific embodiments have been illustrated and described, numerous modifications come to mind without significantly departing from the spirit of the disclosure and the scope of protection is only limited by the scope of the accompanying Claims.

Further, the claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A convertible cargo holder for a bicycle, the convertible cargo holder being operable in two modes, a cargo mode and a child carry mode, comprising:
    a frame comprising a first frame end having a first end and a second end, a second frame end having a first end and a second end, and a hoop secured to the first end of the first frame end and the first end of the second frame end, wherein a first bracket is provided at the second end of the first frame end, and a second bracket is provided at the second end of the second frame end, wherein the first and second brackets are secured to the bicycle to secure the frame to the bicycle, and wherein the hoop has a first end portion adjacent the first frame end, a second end portion adjacent the second frame end, a first side portion between the first frame end and the second frame end, and a second side portion opposite the first side portion and between the first frame end and the second frame end;
    a liner removably secured to the frame, the liner having first and second side walls, first and second end walls, and a bottom wall;
    wherein in the cargo mode the first end of the first side wall is removably secured to the first end of the first end wall with a zipper connection, the second end of the first side wall is removably secured to the first end of the second end wall with a zipper connection, the first end of the second side wall is removably secured to the second end of the first end wall with a zipper connection, the second end of the second side wall is removably secured to the second end of the second end wall with a zipper connection, a top of the first end wall is secured to first end portion of the hoop, a top of the second end wall is secured to the second end portion of the hoop, a top of the first side wall is secured to the first side portion of the hoop, and a top of the second side wall is secured to the second side portion of the hoop;
    wherein in the child carry mode the zipper connection between the first end of the first side wall and the first end of the first end wall is unzipped and the zipper connection between the second end of the first side wall and the first end of the second end wall is unzipped to disconnect at least a portion of the first side wall from the first end wall and the second end wall, and the zipper connection between the first end of the second side wall and the second end of the first end wall is unzipped and the zipper connection between the second end of the second side wall and the second end of the second end wall is unzipped to disconnect at least a portion of the second side wall from the first end wall and the second end wall; and,
    a first receiver positioned adjacent a rear wheel of the bicycle and distal the hoop to secure the top of the first side wall of the liner thereto in the child carry mode, and a second receiver positioned adjacent an opposing side of the rear wheel of the bicycle and distal the hoop to secure the top of the second side wall of the liner thereto in the child carry mode.

2. The convertible cargo holder of claim 1, further comprising at least one fastener for securing the top of the first end wall to first end portion of the hoop, at least one fastener for securing the top of the second end wall to the second end portion of the hoop, at least one fastener for securing the top of the first side wall to the first side portion of the hoop, and at least one fastener for securing the top of the second side wall to the second side portion of the hoop.

3. The convertible cargo holder of claim 1, wherein the liner further comprises a bottom wall between a bottom of the first end wall, a bottom of the second end wall, a bottom of the first side wall, and a bottom of the second side wall.

4. The convertible cargo holder of claim 3, wherein the bottom wall has at least one opening there through to allow access to the bicycle.

5. The convertible cargo holder of claim 4, further comprising a first seat for the convertible cargo holder that is secured to the bicycle through the at least one opening in the bottom wall.

6. The convertible cargo holder of claim 5, further comprising a second seat for the convertible cargo holder that is secured to the bicycle through another of the at least one opening in the bottom wall.

7. The convertible cargo holder of claim 4, further comprising a removable child bicycle seat for the convertible cargo holder that is secured to the bicycle through the at least one opening in the bottom wall.

8. A convertible cargo holder for a bicycle, the convertible cargo holder being operable in two modes, a cargo mode and a child carry mode, comprising:
   a frame comprising a first frame end, a second end frame, and a hoop secured to the first frame end and the second frame end, wherein the frame is secured to the bicycle;
   a liner removably secured to the frame, the liner having first and second side walls, first and second end walls, and a bottom wall, the liner further having disconnecting fasteners to secure the first side wall to the first and second end walls, and disconnecting fasteners to secure the second side wall to the first and second end walls;
   wherein in the cargo mode the first side wall is secured to the first and second end walls, the second side wall is secured to the first and second end walls, and tops of the first side wall, second side wall, first end wall and second end wall are secured to the hoop to create a basket; and,
   wherein in the child carry mode the first side wall is disconnected from the first and second end walls and from the hoop, and the second side wall is disconnected from the first and second end walls and from the hoop, and wherein the first side wall and the second side wall hang below the bottom wall.

9. The convertible cargo holder of claim 8, further comprising a first receiver positioned adjacent a rear wheel of the bicycle and distal the hoop to secure the top of the first side wall of the liner thereto in the child carry mode, and a second receiver positioned adjacent an opposing side of the rear wheel of the bicycle and distal the hoop to secure the top of the second side wall of the liner thereto in the child carry mode.

10. The convertible cargo holder of claim 8, further comprising a disconnecting fastener to secure the top of first side wall to the hoop, and a disconnecting fastener to secure the top of the second side wall to the hoop.

11. The convertible cargo holder of claim 8, wherein the bottom wall has at least one opening there through to allow access to the bicycle.

12. The convertible cargo holder of claim 11, further comprising a first seat for the convertible cargo holder that is secured to the bicycle through the at least one opening in the bottom wall.

13. The convertible cargo holder of claim 12, further comprising a second seat for the convertible cargo holder that is secured to the bicycle through another of the at least one opening in the bottom wall.

14. The convertible cargo holder of claim 8, wherein the frame is secured to the bicycle by connecting the first frame end to the bicycle and the second frame end to the bicycle.

15. A convertible cargo holder for a bicycle, the convertible cargo holder being operable in two modes, a cargo mode and a child carry mode, comprising:
   a frame comprising a first frame end, a second end frame, and a hoop secured to the first frame end and the second frame end, wherein the frame is secured to the bicycle;
   a liner removably secured to the frame, the liner having first and second side walls, first and second end walls, and a bottom wall, wherein the first side wall is removably secured to the first and second end walls, and wherein the second side wall is removably secured to the first and second end walls;
   wherein in the cargo mode the first side wall is secured to the first and second end walls, the second side wall is secured to the first and second end walls, and tops of the first side wall, second side wall, first end wall and second end wall are secured to the hoop to create a basket;
   wherein in the child carry mode the first side wall is disconnected from the first and second end walls and from the hoop, and the second side wall is disconnected from the first and second end walls and from the hoop, and wherein the first side wall and the second side wall hang below the bottom wall; and,
   a first receiver positioned adjacent a rear wheel of the bicycle and distal the hoop to secure the top of the first side wall of the liner thereto in the child carry mode, and a second receiver positioned adjacent an opposing side of the rear wheel of the bicycle and distal the hoop to secure the top of the second side wall of the liner thereto in the child carry mode.

16. The convertible cargo holder of claim 15, the liner further having fasteners to secure the first side wall to the first and second end walls, and fasteners to secure the second side wall to the first and second end walls.

17. The convertible cargo holder of claim 16, wherein the fasteners to secure the first side wall and the second side wall to the first and second end walls are zippers.

18. The convertible cargo holder of claim 15, the liner further having a fastener to secure the top of the first side wall to the hoop, and a fastener to secure the top of the second side wall to hoop.

19. The convertible cargo holder of claim 15, wherein the bottom wall has at least one opening there through to allow access to the bicycle.

20. The convertible cargo holder of claim 19, further comprising a first seat for the convertible cargo holder that engages one of the first frame end and the second frame end, and that is secured to the bicycle through the at least one opening in the bottom wall.

* * * * *